United States Patent [19]

Hutcheson

[11] 4,394,204
[45] Jul. 19, 1983

[54] METHOD FOR HEAT SEALING

[75] Inventor: James L. Hutcheson, Mechanicsville, Va.

[73] Assignee: Reynolds Metals Company, Richmond, Va.

[21] Appl. No.: 170,052

[22] Filed: Jul. 18, 1980

Related U.S. Application Data

[60] Continuation-in-part of Ser. No. 132,494, Mar. 21, 1980, abandoned, and Ser. No. 75,844, Sep. 14, 1979, abandoned, said Ser. No. 132,494, is a division of Ser. No. 75,844.

[51] Int. Cl.³ .................. B32B 31/00; B32B 31/20
[52] U.S. Cl. .................. 156/275.1; 53/479; 156/281; 156/308.4; 156/309.9; 156/322; 156/380; 156/498; 156/499; 493/190; 493/206; 493/308
[58] Field of Search .............. 156/82, 87, 272, 308.4, 156/322, 380, 498, 499, 281, 309.9; 93/DIG. 1; 53/479

[56] References Cited

U.S. PATENT DOCUMENTS 2,984,598  5/1961  Gobalet ........................ 156/322
3,519,515  7/1970  Jennings ..................... 156/308.4
3,536,567 10/1970  Harrison ...................... 156/498

Primary Examiner—John J. Gallagher
Attorney, Agent, or Firm—Alan T. McDonald

[57] ABSTRACT

A method and apparatus for hermetically heat sealing flexible containers, and particularly pouch-like containers, is disclosed. A filled pouch is positioned between a pair of heated bars, with the bars being constructed and arranged to maintain a gap therebetween, such that pressure is not applied to the pouch. Thereafter, the pouch is positioned between a pair of chilled sealing bars and the chilled bars are constructed and arranged to apply sealing pressure to the edge of the pouch, where the edge region of the pouch is sealed and cooled. If desired, a plurality of gapped heated bar stations may be provided prior to the chill bar position.

8 Claims, 5 Drawing Figures

METHOD FOR HEAT SEALING

CROSS-REFERENCE TO RELATED APPLICATIONS

This application is a continuation-in-part of U.S. application Ser. No. 75,844, filed Sept. 14, 1979 now abandoned and is a continuation-in-part of U.S. application Ser. No. 132,494, filed Mar. 21, 1980, now abandoned U.S. application Ser. No. 132,494 being a division of U.S. application Ser. No. 75,844.

BACKGROUND OF THE INVENTION

Numerous materials are packaged in flexible containers, such as flexible pouch-like containers. Such pouches may be formed from pairs of webs which are heat sealed to one another. Alternatively, the pouch may be formed from a single web which is folded, with the side seams and top seam, and optionally the folded bottom edge, being heat sealed. Such pouch-like containers may be fabricated from thermoplastic resins or laminates including inner heat-sealable layers fabricated from thermoplastic resins. Thus, pouches are commonly formed from a pair of lamina in which each lamina comprises an outer layer of a plastics resin film, a central barrier layer of a metallic foil, such as aluminum foil, and an inner layer of a heat-sealable thermoplastic resin film, or from folded webs of these sheet materials.

In filling and heat sealing pouches with foodstuffs and the like, contamination of the top edge region of the pouch, which is the area where the final seal is to be formed, is a continuing problem. Quite often, solid food particles will cling to the walls of the pouch in the edge region where this final heat seal is to be located. This contamination requires that the region to be heat sealed be cleaned of food particles prior to sealing, since these particles will interfere with the heat sealing operation, causing gaps, blisters, blemishes or other defects in the heat seal and possible failure in the seal, which seal must be a hermetic seal. Such cleaning has in the past been accomplished by means of pressurized steam. While pressurized steam successfully cleanses the edge region which is to be heat sealed from solid food particles, the steam which is employed presents a sealing problem of its own. Moisture now present in the heat seal region can cause blister defects in the seal, due to entrapment of the moisture in the sealing region and the conversion of this moisture in the sealing region to steam under pressure by the heated pressurizing sealing bars, and thus also cause failures in the heat seal, preventing a hermetic seal from being produced. Thus, it is a primary object of the present invention to improve the final hermetic heat seal formed on a filled pouch by elimination of these moisture-caused defects.

THE PRESENT INVENTION

The present invention provides the desired improvement in forming the final hermetic heat sealed edge for a filled pouch. The method of the present invention comprises positioning a pouch between a pair of heated bars, maintaining a gap between the bars such that pressure is not applied to the heat-sealing region of the pouch during heating thereof, positioning the pouch between a pair of chilled sealing bars with the previously heated region of the pouch therebetween, and applying sealing pressure to the previously heated edge region of the pouch while sealing and cooling this region. Optionally, the pouch may be positioned between additional pairs of gapped heated bars prior to final sealing at the chilled bars.

The apparatus of the present invention comprises the pair or pairs of gapped heated bars, the pair of chilled sealing bars and the means for positioning the pouch between the bar pairs.

Employment of the method and apparatus of the present invention provides hermetic heat seals which are free from defects due to moisture and which will seal through contaminates which are not entirely removed by the cleaning operation, such as grease, consistently.

BRIEF DESCRIPTION OF THE DRAWINGS

The method and apparatus of the present invention will be more fully described with reference to the drawings in which.

DETAILED DESCRIPTION OF THE PREFERRED EMBODIMENTS

Figure 1:
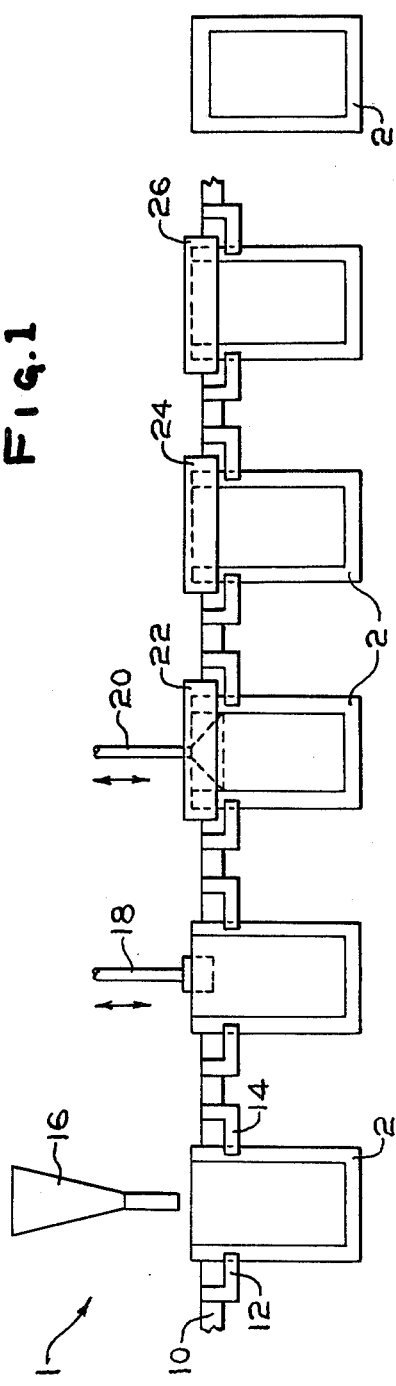
FIG. 1 is a schematic view of a pouch filling and sealing line employing the method and apparatus of the present invention.

Turning to FIG. 1, a pouch filling and sealing line 1 is schematically illustrated. This line 1 may be a line employing pre-formed pouches 2 as its supply, or the line 1 may include means for forming the pouches 2 from a roll of pouch sheet stock. A typical line 1 for forming, filling and sealing pouches which may be employed in the practice of the present invention is a Bartelt IMR Intermittent Motion Flexible Pouch Packager, produced by Rexham Corporation. Since whether the pouches 2 are pre-formed or formed in the filling and sealing apparatus 1 from sheet stock is unimportant to the practice of the present invention, this pouch forming operation is not illustrated in FIG. 1. Thus, FIG. 1 illustrates the operation from the filling of the pouches 2.

Each pouch 2 is held, as it is positioned from station to station, by means of a pair of grippers 12 and 14. These grippers 12 and 14 are attached to means 10 for positioning the grippers 12 and 14 and the pouch 2 carried therebetween from station to station intermittently. The means 10 may be a chain, belt or the like, and is preferably a chain. This chain 10 is connected to motor means and timing means (not shown) for intermittently moving the chain 10, the grippers 12 and 14 and the pouch 2 from station to station.

The first station illustrated in FIG. 1 is a filling station. The product 4 to be packaged within the pouch 2 is fed to the pouch 2 by means of filling means 16. If two or more separate products are to be fed to the pouch 2, such as, for example, meat chunks and gravy, multiple filling stations, each employing a filling means 16, may be used.

The second station illustrated is an air removal position. At this position, a nozzle 18 enters the pouch 2 and superheated steam, at a temperature preferably between about 250° and 350° F. (121° and 206.5° C.) and at a pressure preferably between about 3 and 7 psig (2109.3 and 4921.7 kilograms per square meter) is injected into the pouch 2 to remove air from the pouch 2 prior to sealing thereof.

At the next station, two separate operations occur. First, a nozzle 20 enters the pouch 2. This nozzle 20 has a plurality of openings which direct heated and pressurized steam at the inside of the top edge 6 of the pouch 2 to clean this region 6 of the pouch 2. This is the region 6 of the pouch 2 which is to be hermetically heat sealed. The steam employed for cleaning the pouch 2 is supplied at a temperature preferably between about 121° and 275° F. (100° and 135° C.) and at a pressure preferably between about 15 and 25 psig (10,546.5 and 17,577.5 kilograms per square meter).

Figure 2:
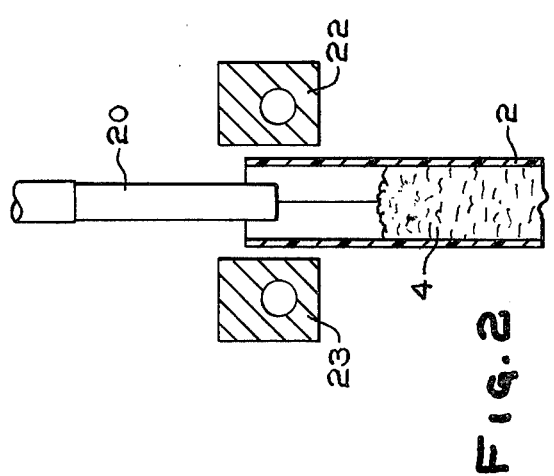
FIG. 2 illustrates the positioning of the pouch between a pair of heated bars prior to closing of the bars.

FIG. 2 illustrates the position of the nozzle 20 as it cleans the pouch 2. Also illustrated in FIG. 2 are a pair of heated bars 22 and 23. In FIG. 2 these bars are in their open position.

Figure 3:
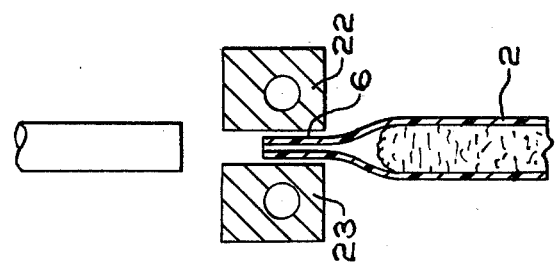
FIG. 3 illustrates the pouch positioned between the heated bars with the bars in their closed position.

FIG. 3 illustrates the nozzle 20 having been retracted out of the pouch 2. At the same time, the heated bars 22 and 23 are closed. Typical means (not shown) for opening and closing heated bars 22 and 23, as well as bars 24, 25, 26 and 27 to be described below, are adjustable, cam-activated arms and the like. Such means comprise a part of the known filling and sealing machines previously mentioned. The bars 22 and 23 are closed to a point with a gap remaining therebetween. That is, while the bars 22 and 23 contact the outside of uppermost edge 6 of the pouch 2, and apply heat to this edge 6, no pressure is applied by the bars 22 and 23 to firmly contact the inside surfaces of the pouch 2 and seal the edge 6 of the pouch 2 during heating thereof. This permits moisture to evaporate from the sealing edge 6, permitting a final hermetic seal to be formed which is free of blisters and other defects. The heated bars 22 and 23 are maintained at a gap preferably between about 0.001 and 0.005 inches (0.00254 and 0.0127 centimeters) greater than the total thickness of the edge region 6 to be sealed and at a temperature preferably between about 212° and 500° F. (100.0° and 315.5° C.), which temperature is chosen to be above the melting point of the thermoplastic resin used to form the pouch 2, or forming the inner layer of a laminated pouch 2. The bars 22 and 23 may be heated, for example, by electrical resistance heaters located within the bars 22 and 23 or by other known means.

Figure 4:
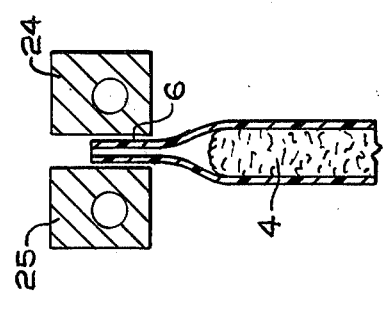
FIG. 4 illustrates the pouch being positioned between a second pair of heated bars, with the bars in their closed position.

FIG. 4 illustrates an optional, but preferred, additional pair of heated bars 24 and 25 in their closed position. Similar to FIGS. 2 and 3, the pouch 2 is positioned between the bars 24 and 25 while the bars 24 and 25 are open and bars 24 and 25 are then closed. Again, a gap is maintained between the bars 24 and 25, so that no pressure is applied to the pouch edge 6 during heating thereof. This gap may preferably range between about 0.001 and 0.005 inches (0.00254 and 0.0127 centimeters) greater than the total thickness of the edge region 6 to be sealed. The bars 24 and 25 are preferably maintained at a temperature ranging between about 212° and 500° F. (100.0° and 315° C.), the temperature again being chosen dependent upon the thermoplastic resin employed in forming the inner surface of the pouch 2.

Figure 5:
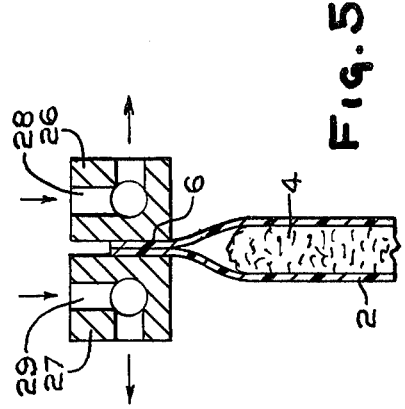
FIG. 5 illustrates the pouch being finally sealed between a pair of chilled sealing bars.

FIG. 5 illustrates the final sealing of the edge 6 of the pouch 2. The pouch 2 is positioned between a pair of chilled sealing bars 26 and 27, which are once again in their open position. The bars 26 and 27 are then closed, with the edge 6 of the pouch 2 being locked therebetween. The bars 26 and 27 provide a sealing pressure preferably ranging from between about 10 and 100 pounds per square inch (7,301 and 70,310 kilograms per square centimeter), dependent upon the material employed as the inner surface of the pouch 2, on the edge 6 and the heat seal in the edge 6 is set and cooled by means of the chilled sealing bars 26 and 27. The chilled sealing bars 26 and 27 each have chambers 28 and 29, respectively, through which a cooling fluid, such as water, is constantly flowed at a temperature preferably ranging between about 50° and 100° F. (10° and 38° C.), dependent upon the sheet material employed to form the pouch 2, to cool the bars 26 and 27 and the now hermetic heat seal in the edge 6 of the pouch 2. The bars 26 and 27 may be bare metal bars, or may be covered with a resilient surface, such as silicone rubber or a Teflon ® impregnated glass fiber cloth or a combination of the resilient surface and the impregnated cloth. At this point, the completed pouch 2 may be transferred from the line and packaged for shipment.

As previously mentioned, the spaced heated bars 22 and 23, and optionally 24 and 25, evaporate moisture from the heat seal edge region 6. In addition, it has been found that employment of the spaced heated bars and the pressurizing chilled sealing bars 26 and 27 permits sealing of the edge portion 6 through grease and other contaminants which are not completely removed by the cleaning nozzle 20 and which is the past have caused defective seals, thus adding to the formation of a hermetic seal. The mechanism for this action is unknown.

Numerous modifications to the filling and sealing line, while maintaining the gapped heated bars-pressurizing chilled sealing bars relationship may be accomplished. Thus, for example, the air removal step and cleaning step may be accomplished in a single operation, by means of a single nozzle, which, for example, could be located at the position containing the first set of spaced heated bars 22 and 23. A nozzle which may be employed for this purpose is the nozzle described in co-pending U.S. application Ser. No. 75,800, filed Sept. 14, 1979, which is assigned to the assignee of the present invention and the disclosure of which is hereby incorporated herein by reference. Further, additional pairs of gapped heated bars may be employed prior to the pressurizing chilled sealing bars, if desired. The choice as to the number of pairs of gapped heated bars to be employed is determined by the speed of the line, the temperatures of the bars, the material forming the pouch 2 and the material packaged within the pouch 2.

If more than one pair of gapped heated bars are employed, the pair immediately prior to the chilled bars may be vertically positioned slightly higher than the preceeding bar pairs. Whether or not plural pairs of heated bars are employed, the chilled sealing bars may be vertically offset slightly with respect to one another.

Alternatively, the method of the present invention may be employed with a continuous filling and sealing machine where pouches pass through a length of heated gapped bars and a chilling sealing mechanism, which may be a pair of chilled bars or a pressurizing chilled roller system.

While presently preferred embodiments of the present invention have been illustrated and described, it will be understood that the invention may be otherwise variously embodied and practiced within the scope of the following claims.

I claim:

1. In a method of forming a heat seal on the open end of a flexible container after filling of said flexible container and cleaning of said open end of said flexible container, said cleaning producing moisture on said open end of said flexible container, said flexible container comprising a pair of generally planar walls which have been heat sealed to one another, comprising positioning said open end of said flexible container between a pair of heated bars and subsequently positioning said open end of said flexible container between a pair of chilled bars the improvement comprising maintaining a sufficient gap between said heated bars such that no pressure is applied to said open end of said flexible container while said open end of said flexible container is positioned between said pair of heated bars, evaporating said moisture from said open end of said flexible container while said open end of said flexible container is positioned between said pair of heated bars and applying sealing pressure to said open end of said flexible container while cooling said open end of said flexible container while said open end of said flexible container is positioned between said pair of chilled bars to thereby provide a hermetic seal on said open end of said flexible container.

2. The method of claim 1 wherein said heated bars are maintained at a temperature between about 212° and 500° F. (100.0° and 315.5° C.).

3. The method of claim 1 wherein said chilled bars are maintained at a temperature between about 50° and 100° F. (10° and 38° C.).

4. The method of claim 1 wherein said chilled bars apply a sealing pressure between about 10 and 100 pounds per square inch (7,031 to 70,310 kilograms per square meter) to said open end of said flexible container.

5. The method of claim 1 wherein said gap between said heated bars is maintained between about 0.001 and 0.005 inches (0.00254 and 0.0127 centimeters) greater than the total thickness of said flexible container.

6. The method of claim 1 further comprising positioning said open end of said flexible container between at least one additional pair of heated bars prior to said positioning said open end of said flexible container between said pair of chilled bars and maintaining a gap between said additional pairs of heated bars such that no pressure is applied to said open end of said flexible container prior to said positioning of said flexible container between said pair of chilled bars.

7. The method of claim 1 wherein said additional heated bars are maintained at a temperature between about 212° and 500° F. (100.0° and 315.5° C.).

8. The method of claim 1 wherein said gap between said additional heated bars is maintained between about 0.001 and 0.005 inches (0.00254 and 0.0127 centimeters) greater than the total thickness of said container.

* * * * *